United States Patent
Kawamura et al.

(10) Patent No.: US 10,886,823 B2
(45) Date of Patent: Jan. 5, 2021

(54) STATOR FOR ROTARY ELECTRIC MACHINE, ROTARY ELECTRIC MACHINE, AND METHOD FOR MANUFACTURING STATOR FOR ROTARY ELECTRIC MACHINE

(71) Applicant: MITSUBISHI ELECTRIC CORPORATION, Tokyo (JP)

(72) Inventors: Koji Kawamura, Tokyo (JP); Naohiro Motoishi, Tokyo (JP); Takatoshi Masuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 68 days.

(21) Appl. No.: 16/083,068

(22) PCT Filed: Mar. 3, 2017

(86) PCT No.: PCT/JP2017/008569
§ 371 (c)(1),
(2) Date: Sep. 7, 2018

(87) PCT Pub. No.: WO2017/163824
PCT Pub. Date: Sep. 28, 2017

(65) Prior Publication Data
US 2019/0097502 A1    Mar. 28, 2019

(30) Foreign Application Priority Data

Mar. 22, 2016 (JP) .................................. 2016-056839

(51) Int. Cl.
*H02K 15/00* (2006.01)
*H02K 3/50* (2006.01)
(Continued)

(52) U.S. Cl.
CPC ........... *H02K 15/0062* (2013.01); *H02K 1/18* (2013.01); *H02K 3/12* (2013.01); *H02K 3/50* (2013.01);
(Continued)

(58) Field of Classification Search
CPC .. H02K 1/18; H02K 15/0062; H02K 15/0068; H02K 15/0081; H02K 15/04;
(Continued)

(56) References Cited

U.S. PATENT DOCUMENTS

| 8,443,509 | B1 * | 5/2013 | De Souza | .......... H02K 15/0081 29/596 |
| 2002/0024266 | A1 * | 2/2002 | Asao | ........................ H02K 3/38 310/201 |

(Continued)

FOREIGN PATENT DOCUMENTS

| JP | 2012-257391 A | 12/2012 | |
| JP | 2015104249 A | * 6/2015 | ............... H02K 3/50 |
| JP | 2015220875 A | * 12/2015 | |

OTHER PUBLICATIONS

Machine translation of JP-2015220875-A. (Year: 2015).*

(Continued)

*Primary Examiner* — Michael Andrews
(74) *Attorney, Agent, or Firm* — Buchanan Ingersoll & Rooney PC

(57) ABSTRACT

A first terminal portion of a first terminal wire of one divisional coil, and a second terminal portion of a second terminal wire of another divisional coil, extend from the entrance side or the bottom side of a slot so as to be directed upward in the axial direction and arranged side by side in the radial direction of a stator on the upper side in the axial direction of a stator core. The end of the first terminal portion and the end of the second terminal portion are joined (Continued)

to each other by a joining part. At least one of the first terminal portion and the second terminal portion leading to the joining part has an engagement portion for positioning the first terminal portion and the second terminal portion with each other in the circumferential direction and the radial direction.

17 Claims, 13 Drawing Sheets

(51) Int. Cl.
H02K 1/18 (2006.01)
H02K 15/085 (2006.01)
H02K 15/04 (2006.01)
H02K 3/12 (2006.01)
H02K 21/14 (2006.01)

(52) U.S. Cl.
CPC ......... H02K 15/0081 (2013.01); H02K 15/04 (2013.01); H02K 15/085 (2013.01); H02K 21/14 (2013.01)

(58) Field of Classification Search
CPC .......... H02K 15/085; H02K 3/28; H02K 3/50; H02K 3/505; H02K 3/12; H02K 21/14; B23K 26/70; B23K 26/22; B23K 26/32; B23K 9/0026; B23K 9/167; B23K 9/23; B23K 9/235; B23K 9/321; B23K 11/002; B23K 11/18; B23K 11/185; B23K 37/0435
USPC .............. 310/71, 216.099, 216.101, 216.102
See application file for complete search history.

(56) References Cited

U.S. PATENT DOCUMENTS

2010/0102664 A1* 4/2010 Chen ..................... H02K 3/12
310/179
2012/0301309 A1* 11/2012 Nishioka .............. B23K 9/0282
416/223 R

OTHER PUBLICATIONS

Machine translation of JP-2015104249-A. (Year: 2015).*
International Search Report (PCT/ISA/210) dated May 30, 2017, by the Japanese Patent Office as the International Searching Authority for International Application No. PCT/JP2017/008569.
Written Opinion (PCT/ISA/237) dated May 30, 2017, by the Japanese Patent Office as the International Searching Authority for International Application No. PCT/JP2017/008569.

* cited by examiner

STATOR FOR ROTARY ELECTRIC MACHINE, ROTARY ELECTRIC MACHINE, AND METHOD FOR MANUFACTURING STATOR FOR ROTARY ELECTRIC MACHINE

TECHNICAL FIELD

The present invention relates to a stator for rotary electric machine, a rotary electric machine, and a method for manufacturing a stator for rotary electric machine, in which the height in the axial direction of a coil end part is lowered so that the product size can be reduced.

BACKGROUND ART

As winding methods for a stator coil of a rotary electric machine, there are a concentrated winding method in which a coil is wound on each magnetic pole in a concentrated manner, and a distributed winding method in which a stator coil is wound so as to stride over a plurality of magnetic poles. As compared to the concentrated winding method, in the distributed winding method, distribution of a rotating magnetic field is smoothed and thus there is an advantage that vibration can be reduced during operation of the rotary electric machine.

At a coil end part of a stator coil wound by the distributed winding method, a plurality of wires overlap each other, so that the coil end part becomes high in the axial direction, and this hampers size reduction of the rotary electric machine.

Accordingly, as one of means for reducing the height of the coil end part by optimizing the manner of overlapping of wires at a coil end part in the distributed winding method so as to minimize a gap between the overlapping wires, a stator coil winding method is proposed in which a stator coil for one phase is divided into a plurality of divisional coils and these divisional coils are joined to each other after mounted to a stator core.

In this method, of each divisional coil, a part that will become a coil end part is formed in advance into such a shape as to minimize a gap formed when the divisional coils overlap each other, and such divisional coils are mounted to the stator core, whereby unnecessary gaps in the coil end part are decreased, thus reducing the height of the coil end part.

In the case of forming an integrated coil as a whole while optimizing the coil end shape without dividing the stator coil, it is extremely difficult to mount the coil to the stator core. Therefore, in the above method, the coil is divided into a plurality of divisional coils so as to enable mounting in an optimum shape. As an example in which overlapping of wires at a coil end part is optimized by dividing a coil for one phase into a plurality of divisional coils, a technique disclosed in Patent Document 1 is proposed.

CITATION LIST

Patent Document

Patent Document 1: Japanese Laid-Open Patent Publication No. 2012-257391

SUMMARY OF THE INVENTION

Problems to be Solved by the Invention

In Patent Document 1, a stator coil for one phase is divided into a plurality of divisional coils, and therefore it is necessary to, first, assemble the divisional coils and a stator core, and then electrically join terminal portions of the respective divisional coils, to form a stator coil. Therefore, the stator coil includes multiple joining parts between the terminal portions of the divisional coils. In general, means such as welding or brazing is used for joining of the divisional coils. In any means, a predetermined work space is needed around the joining part so as not to damage wires of other divisional coils present near the joining part.

In addition, since joining cannot be performed unless the terminal portions of two divisional coils to be joined are in close contact with each other, it is necessary to bring the terminal portions into close contact with each other by grasping them near the joining part, and a space for arranging a member for grasping the terminal portions is also needed. Further, since insulation coats of the divisional coils near the joining part of the terminal portions are peeled in order to electrically join them, short-circuit occurs if the joining part contacts with another joining part, a stator core, a coil end part, or the like. Therefore, it is necessary to prevent the joining parts from coming into close contact with these members. For such reasons, in Patent Document 1, the joining part of the divisional coils is formed at a position further protruding upward in the axial direction from wires extending from slots to other slots. Therefore, there is a problem that the height of the entire coil end part further increases even though parts to overlap each other of coils are deliberately formed into an optimum shape.

The present invention has been made to solve the above problem, and an object of the present invention is to provide a stator for rotary electric machine, a rotary electric machine, and a method for manufacturing a stator for rotary electric machine, that ensures the insulation distance between the joining parts of the divisional coils and between each joining part and a frame and can prevent the height of a coil end part of a stator coil from increasing due to the terminal joining part of the divisional coils.

Solution to the Problems

A stator for rotary electric machine according to the present invention includes a stator core and a stator coil wound around teeth of the stator core.

The stator core includes an outer core which is an annular back yoke portion, and an inner core having the plurality of teeth radially arranged, and having a connection portion via which inner-circumferential-side ends of the teeth adjacent to each other in a circumferential direction are connected to each other in the circumferential direction, the inner core being fitted to an inner side of the outer core.

Slots are each formed between the teeth adjacent to each other in the circumferential direction, and slot accommodation portions of divisional coils each of which is a minimum unit composing the stator coil are inserted in each slot so as to be arranged side by side in a radial direction.

A first terminal wire of one of the divisional coils and a second terminal wire of another one of the divisional coils extend toward the same side in the axial direction from the two slot accommodation portions adjacently arranged on an entrance side or a bottom side of each slot.

A first terminal portion of the first terminal wire and a second terminal portion of the second terminal wire are arranged, side by side in the radial direction of the stator, on an upper side in the axial direction of the stator core, so as to be directed upward in the axial direction.

An end of the first terminal portion and an end of the second terminal portion are joined to each other by a joining part, and at least one of the first terminal portion and the second terminal portion leading to the joining part has an engagement portion for positioning the first terminal portion and the second terminal portion with each other in the circumferential direction and the radial direction.

A rotary electric machine according to the present invention includes: the stator; and a rotor held so as to be rotatable while being opposed to an inner circumferential surface of the stator.

A method for manufacturing a stator for rotary electric machine according to the present invention includes:

a peeling step of peeling an insulation coat of the terminal portion of each divisional coil;

an engagement portion forming step of forming the engagement portion; and a joining step of engaging the first terminal portion and the second terminal portion with each other by the engagement portion provided to at least one of the first terminal portion and the second terminal portion, and fixing the first terminal portion and the second terminal portion with each other in the radial direction, and then joining the ends of the first terminal portion and the second terminal portion to each other.

Effect of the Invention

In the stator for rotary electric machine, the rotary electric machine, and the method for manufacturing the stator for rotary electric machine according to the present invention, the terminal portions of the two divisional coils to be joined are arranged side by side on the entrance side or the bottom side of each slot, and the two terminal portions can be positioned at predetermined positions in the radial direction and the circumferential direction by the engagement portion provided to at least one of the opposed surfaces of the two terminal portions. Thus, joining failure between the divisional coils can be suppressed.

In addition, the two terminal portions are arranged side by side in the radial direction on the outer side or the inner side of the coil end part having no joining part, so as to be directed in the axial direction, and can be joined to each other at a position equal to or lower than the height of the coil end part. Therefore, the height of the entire coil end part can be reduced.

DESCRIPTION OF EMBODIMENTS

Embodiment 1

Hereinafter, a stator for rotary electric machine, a rotary electric machine, and a method for manufacturing a stator for rotary electric machine according to embodiment 1 of the present invention will be described with reference to the drawings. As used herein, unless otherwise specified, "axial direction", "circumferential direction", "radial direction", "inner circumferential side", "outer circumferential side", "inner circumferential surface", "outer circumferential surface", "inner side", and "outer side" refer to the "axial direction", the "circumferential direction", the "radial direction", the "inner circumferential side", the "outer circumferential side", the "inner circumferential surface", the "outer circumferential surface", the "inner side", and the "outer side" of the stator, respectively. In addition, unless otherwise specified, terms referring to upper/lower such as "upper end", "lower end", etc. are defined such that, assuming a surface perpendicular to the axial direction at a location as a reference, a side including the central point of the stator using the surface as a border is a "lower side", and the opposite side is an "upper side". In addition, terms "high" and "low" relevant to the height of a coil end part refer to heights as seen from the center of the stator.

Figure 1:
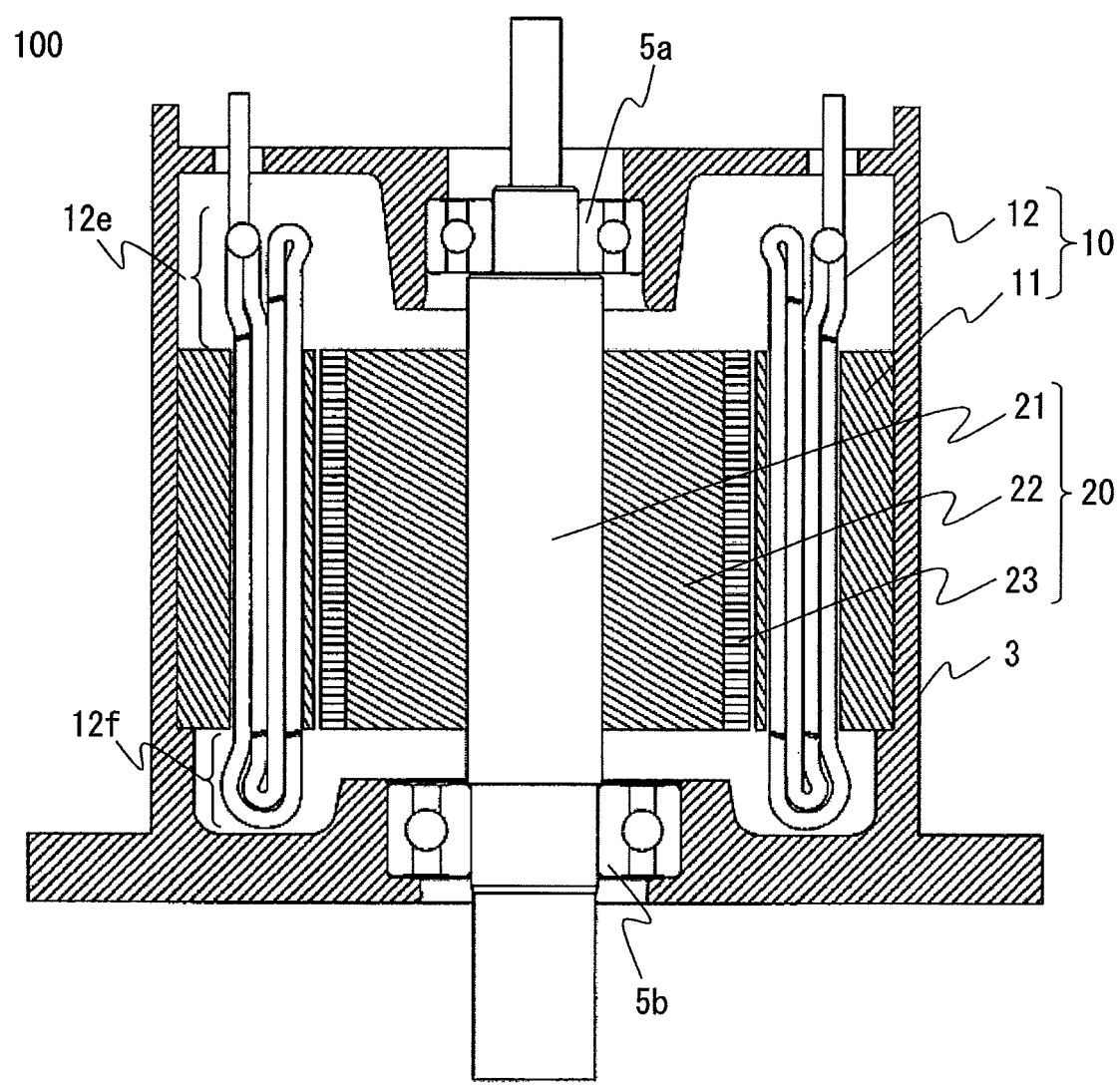
FIG. 1 is a schematic sectional view of a rotary electric machine according to embodiment 1 of the present invention.

FIG. 1 is a schematic sectional view of a rotary electric machine 100.

Figure 2:
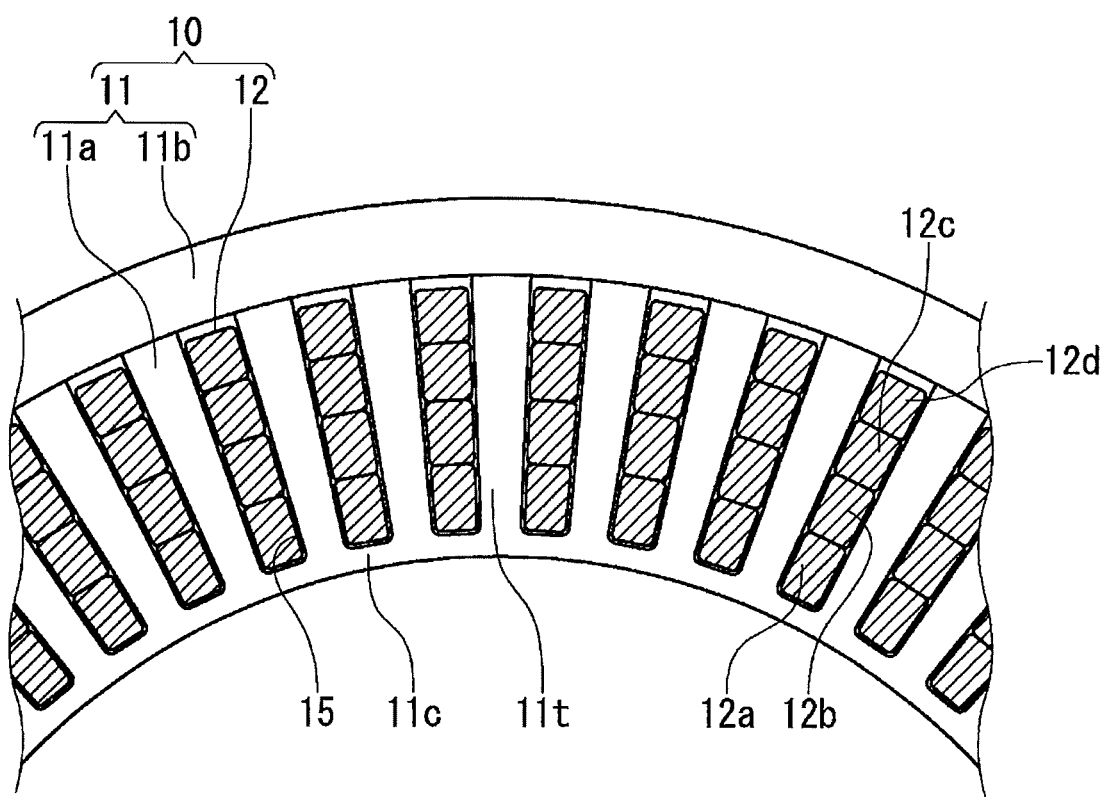
FIG. 2 is a specific-part sectional view of a stator of the rotary electric machine according to embodiment 1 of the present invention.

FIG. 2 is a specific-part sectional view of a stator 10 of the rotary electric machine 100, along the direction perpendicular to the axial direction.

The rotary electric machine 100 includes a stator 10, a rotor 20, and a frame 3 holding these therein.

The stator 10 has substantially a cylindrical shape, and includes a stator core 11 and a stator coil 12 wound to the stator core 11. The stator core 11 is formed by stacking a plurality of thin magnetic sheets made of iron-based material. The stator 10 is fitted and fixed to the inner side of the frame 3 having substantially a cylindrical shape.

The stator core 11 includes an outer core 11$b$ which is an annular yoke, and an inner core 11$a$ fitted to the inner side of the outer core 11$b$. The inner core 11$a$ has a plurality of teeth 11$t$ radially arranged. The inner-circumferential-side end of each tooth 11$t$ is connected to the adjacent tooth 11$t$ via a connection portion 11$c$ in the circumferential direction. Each space between the adjacent teeth 11$t$, in which the stator coil 12 is to be accommodated, serves as a slot 15.

The rotor 20 includes a rotor core 22 having substantially a cylindrical shape and fixed to a rotary shaft 21, and a permanent magnet 23 attached to the outer circumferential surface of the rotor core 22. By two bearings 5$a$, 5$b$ of which the outer circumferences are fixed to the frame 3, the rotor 20 is supported so as to be rotatable with the outer circumferential surface thereof facing the inner circumferential surface of the stator 10.

The frame 3 mechanically holds the stator 10 and the rotor 20 as described above. The frame 3 serves also as a heat dissipation path for the stator 10. For the frame 3, metal material such as iron or aluminum is used.

The stator coil 12 includes coils for three phases or more phases, and the coil for each phase is formed by joining a plurality of divisional coils.

Figure 3A:
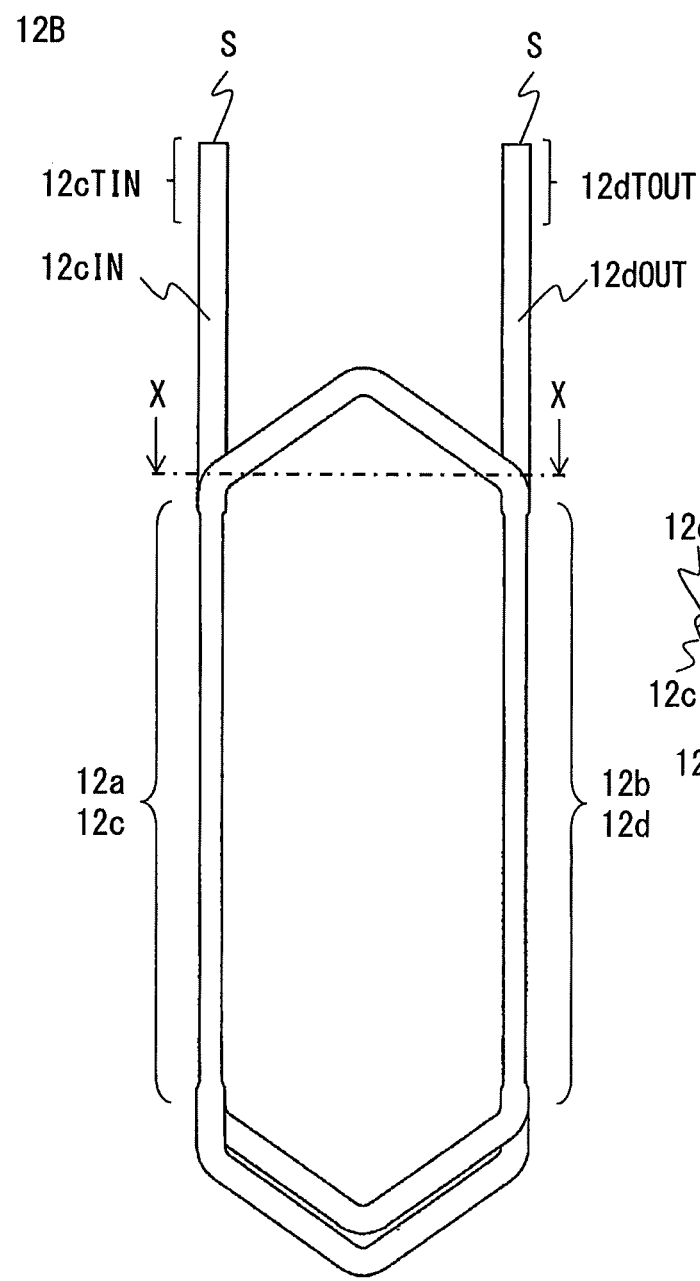
FIG. 3A is a side view of a divisional coil according to embodiment 1 of the present invention.

FIG. 3A is a side view of a divisional coil 12B.

Figure 3B:
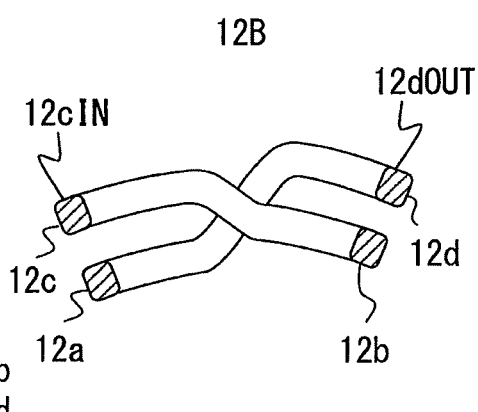
FIG. 3B is a sectional view of a divisional coil according to embodiment 1 of the present invention.

FIG. 3B is a sectional view along X-X line in FIG. 3A.

The divisional coil 12B is a minimum unit coil composing the stator coil 12. That is, the stator coil 12 for one phase is formed by joining a plurality of divisional coils 12B in series or parallel, or in series and parallel. Slot accommodation portions 12$a$ to 12$d$ of the divisional coil 12B are parts to be arranged into the slots 15.

As shown in FIG. 3A and FIG. 3B, the divisional coil 12B is a hexagonal type coil. For a wire forming the divisional coil 12B, a wire material made of a highly conductive metal material such as copper or aluminum is used, and the surface thereof is coated with an insulating resin coat. The divisional coil 12B is formed by winding the insulated wire with one turn or a plurality of (in the present embodiment, approximately two) turns so as to stride over a plurality of teeth 11$t$.

As shown in FIG. 1, of the stator coil 12, parts extending upward in the axial direction from the axial-end surfaces of the stator core 11 are coil end parts 12$e$, 12$f$. At the coil end part 12$e$, the divisional coils 12B are joined to each other, and other necessary wire routing and wire joining are performed. At the coil end part 12$f$ on the opposite side, there is no joining part of the divisional coils 12B.

Next, a method for forming the stator coil 12 in the stator core 11 using a plurality of divisional coils 12B will be described.

Figure 4:
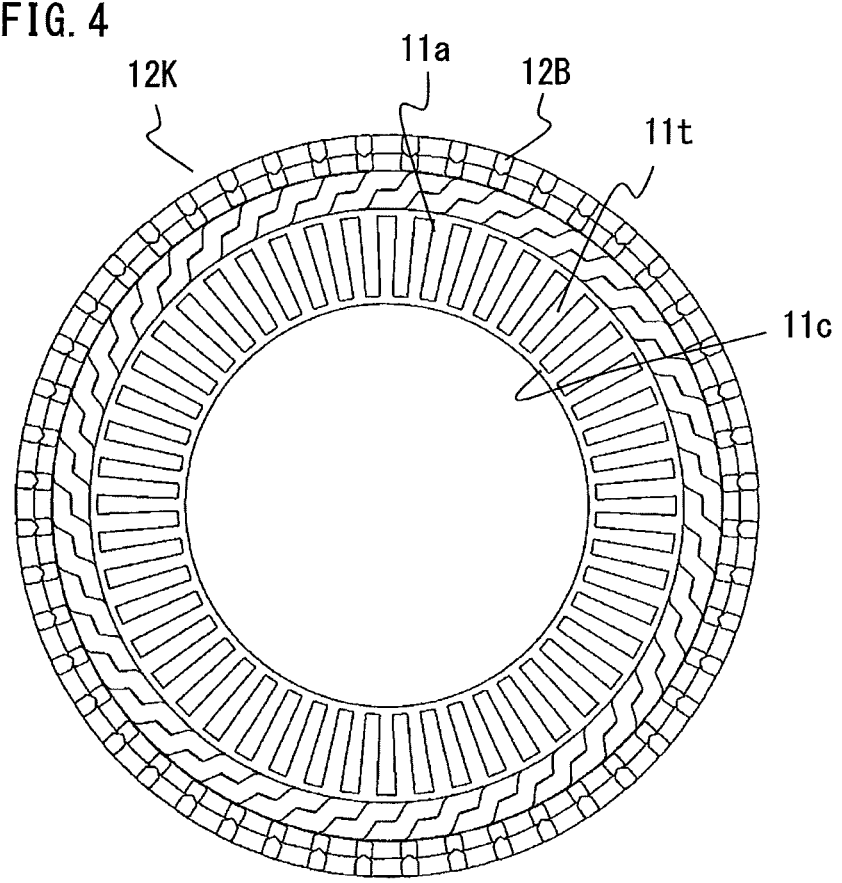
FIG. 4 is a plan view showing a state in which an inner core is arranged inside a coil basket, according to embodiment 1 of the present invention.

FIG. 4 is a plan view showing a state in which the inner core 11$a$ is arranged inside a coil basket 12K.

Figure 5:
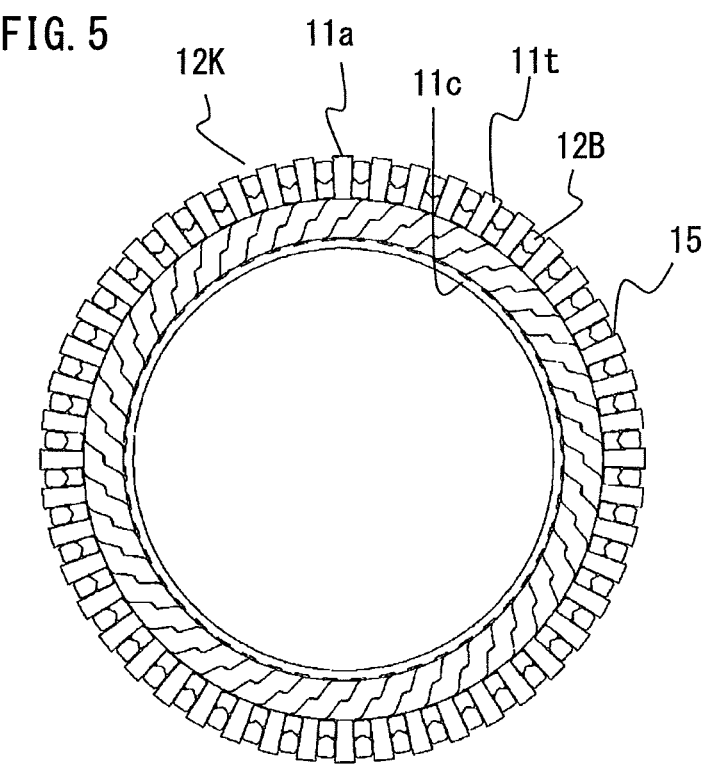
FIG. 5 is a plan view showing a state in which the diameter of the coil basket is reduced, according to embodiment 1 of the present invention.

FIG. 5 is a plan view showing a state in which the diameter of the coil basket 12K is reduced.

Figure 6:
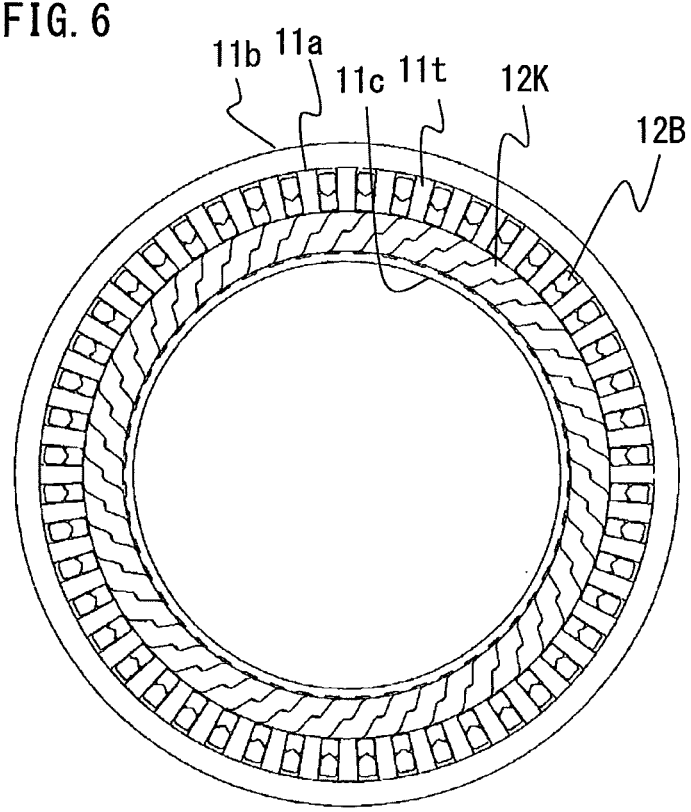
FIG. 6 is a plan view showing a state in which an outer core is fitted to the outer circumferential surface of the inner core, according to embodiment 1 of the present invention.

FIG. 6 is a plan view showing a state in which the outer core 11$b$ is fitted to the outer circumferential surface of the inner core 11$a$.

A stator coil forming step is progressed from FIG. 4 to FIG. 6.

As described above, the inner-circumferential-side end of each tooth 11$t$ of the inner core 11$a$ is connected to the adjacent tooth 11$t$ via the connection portion 11$c$ in the circumferential direction, and each slot 15 between the adjacent teeth 11$t$, in which the stator coil 12 is to be arranged, is opened on the outer circumferential side.

Here, the outer-circumferential-side opening of each slot 15 is referred to as an entrance, and the connected inner-circumferential-side end thereof is referred to as a bottom.

In advance, the same number of divisional coils 12B as the slots 15 are prepared, each of which is formed in a hexagonal shape (polygonal shape) by being wound with approximately two turns as shown in FIG. 3.

First, as shown in FIG. 4, all the divisional coils 12B are combined into a cylindrical basket shape, thereby assembling a coil basket 12K. The inner diameter of the coil basket 12K is slightly greater than the outer diameter of the inner core 11$a$, and the inner core 11$a$ can be arranged inside the coil basket 12K.

Next, although not seen in FIG. 5, from the entrance of each slot 15, four slot accommodation portions 12$a$, 12$b$, 12$c$, 12$d$ of each of all the divisional coils 12B are inserted into the slot 15. The diameter of the coil basket 12K can be reduced by equally moving the slot accommodation portions 12$a$, 12$b$, 12$c$, 12$d$ inward in the radial direction. At this time, focusing on one slot 15, the slot accommodation portion 12$a$ and the slot accommodation portion 12$c$ are the slot accommodation portion 12$a$ and the slot accommodation portion 12$c$ of the same divisional coil 12B, and the slot accommodation portion 12$b$ and the slot accommodation portion 12$d$ are the slot accommodation portion 12$b$ and the slot accommodation portion 12$d$ of another divisional coil 12B.

In other words, the slot accommodation portions 12$a$, 12$c$ of one divisional coil 12B are accommodated in the same slot 15, and the slot accommodation portions 12$b$, 12$d$ of this divisional coil 12B are accommodated in a different slot 15 so as to stride over a plurality of teeth 11$t$.

Next, as shown in FIG. 6, the outer core 11$b$ is fitted to the outer circumferential side of the inner core 11$a$ from the axial direction, whereby the coil basket 12K and the stator core 11 are assembled.

Figure 7:
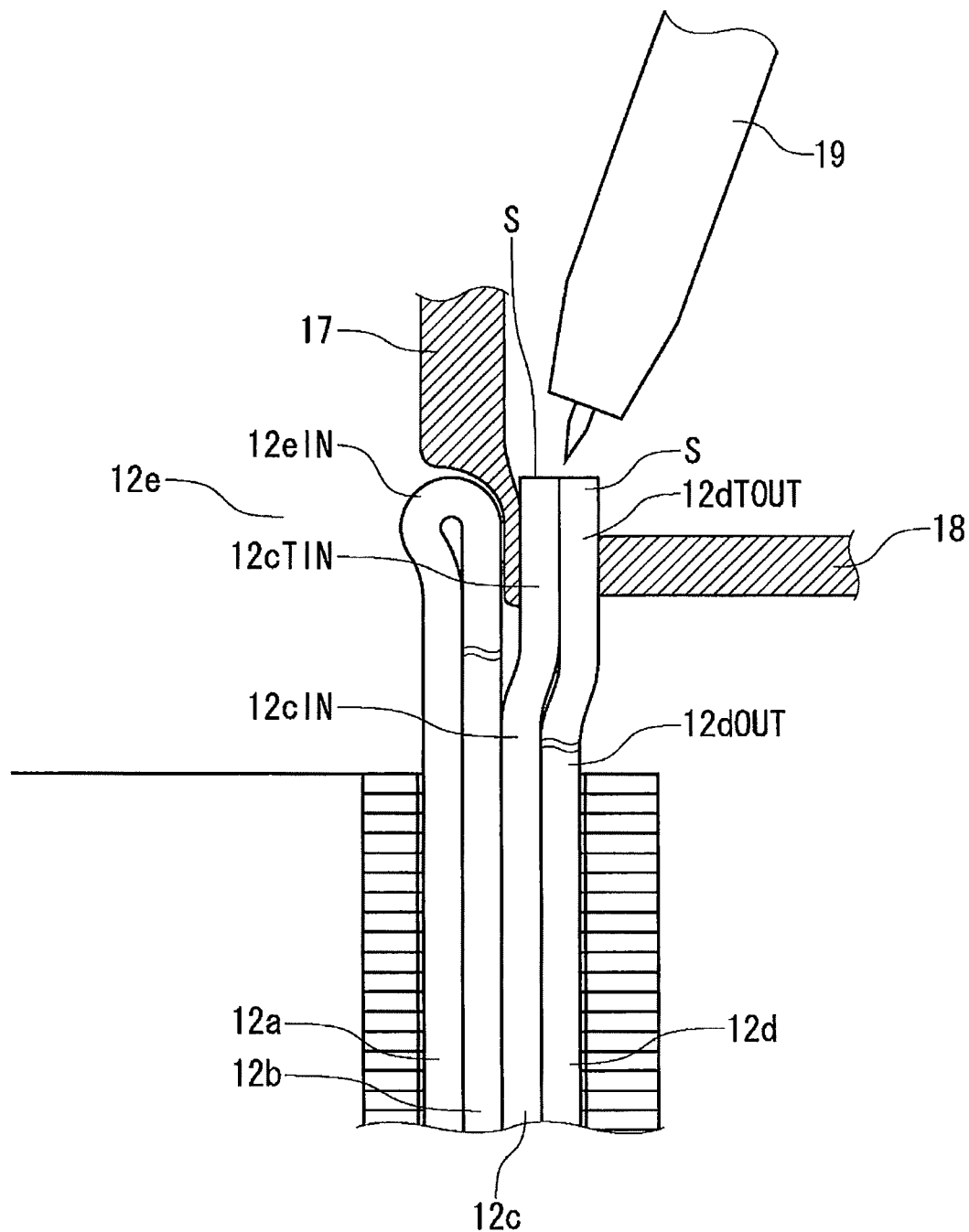
FIG. 7 is a specific-part enlarged sectional view of the stator for which a stator coil is being formed in the state shown in FIG. 6, along a plane including the center axis thereof.

FIG. 7 is a sectional view of the stator 10 in the state shown in FIG. 6, along a plane including the central axis thereof, and is a specific-part enlarged view around terminal portions 12$d$TOUT, 12$c$TIN immediately before the divisional coils 12B are welded to each other. In the drawing, the left side is the inner circumferential side of the stator 10, and the right side is the outer circumferential side thereof.

Figure 8:
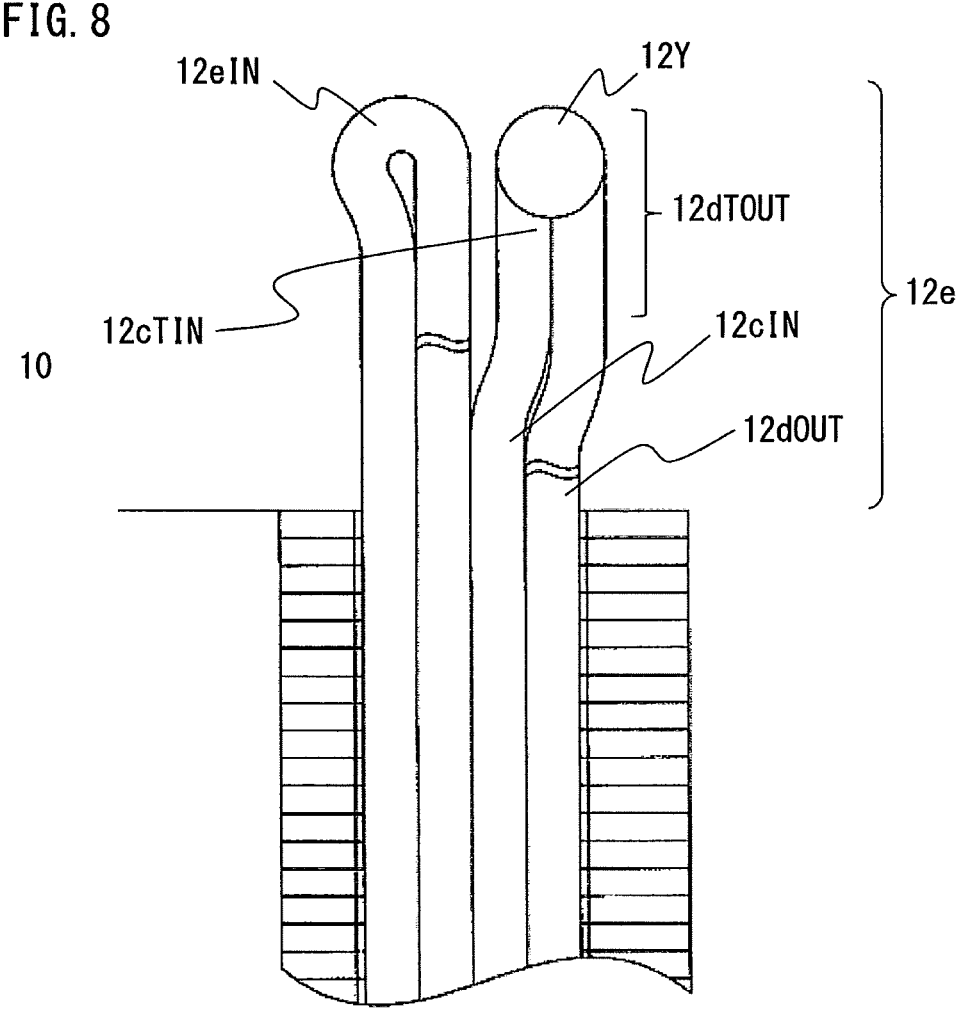
FIG. 8 shows a state after the divisional coils are welded to each other, according to embodiment 1 of the present invention.

FIG. 8 shows a state after the divisional coils 12B are welded to each other.

In FIG. 7, in one slot 15, the slot accommodation portion 12$d$ of one divisional coil 12B is located nearest the entrance side, and the slot accommodation portion 12$c$ of another divisional coil 12B is accommodated at the second position from the entrance. A terminal wire 12$d$OUT (first terminal wire) leading to the slot accommodation portion 12$d$, and a terminal wire 12$c$IN (second terminal wire) leading to the slot accommodation portion 12$c$, extend upward in the axial direction while being adjacent to each other in the radial direction.

A terminal portion 12$d$TOUT (first terminal portion) of one terminal wire 12$d$OUT and a terminal portion 12$c$TIN (second terminal portion) of the other terminal wire 12$c$IN are directed upward in the axial direction of the rotary electric machine 100, and have the same height in the axial direction. The terminal portion 12$d$TOUT and the terminal portion 12$c$TIN are arranged side by side in the radial direction so as to be in contact with each other, and are arranged at equal intervals in the circumferential direction with a pitch corresponding to the slots 15 of the stator 10 in the circumferential direction.

Joining of the two divisional coils 12B is performed by arc welding at ends S of the terminal portion 12dTOUT of one terminal wire 12dOUT and the terminal portion 12cTIN of the other terminal wire 12cIN. Other than arc welding, laser welding, resistance welding, or the like can be applied, or the joining may be performed by a method other than welding.

Figure 9:
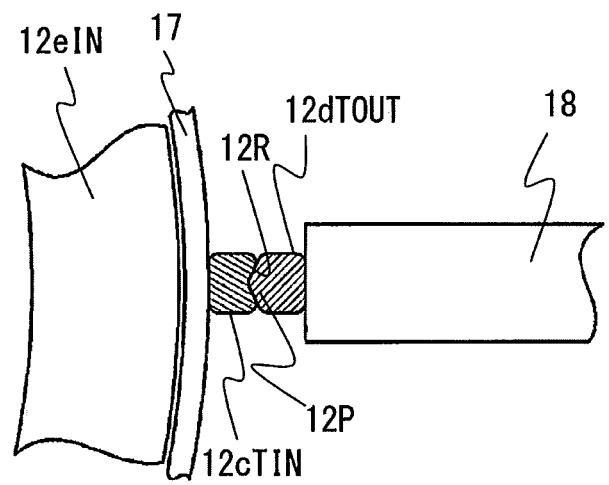
FIG. 9 is a sectional view of both terminal portions along the direction perpendicular to the axial direction in a state in which the terminal portions are fixed by a jig and a light shielding plate, according to embodiment 1 of the present invention.

FIG. 9 is a sectional view of the terminal portions 12dTOUT, 12cTIN along the direction perpendicular to the axial direction in a state in which the terminal portions 12dTOUT, 12cTIN are fixed by a jig 18 and a light shielding plate 17.

The inner circumferential side of the terminal portion 12cTIN arranged on the inner circumferential side has a flat surface along the circumferential direction, and the outer circumferential side of the terminal portion 12cTIN is dented at the center inward in the radial direction so as to have a V-shaped groove 12R (engagement portion) in a cross section perpendicular to the axial direction.

On the other hand, the inner circumferential side of the terminal portion 12dTOUT arranged on the outer circumferential side protrudes at the center toward the inner circumferential side so as to have a triangular protrusion 12P (engagement portion) in a cross section perpendicular to the axial direction. The groove 12R and the protrusion 12P have sectional shapes inverted from each other.

The divisional coils 12B are formed of round wires or rectangular wires. Before each divisional coil 12B is shaped or after the divisional coil 12B is shaped, the groove 12R and the protrusion 12P are respectively formed for the terminal portion 12dTOUT and the terminal portion 12cTIN of the divisional coil 12B by using a die (engagement portion forming step). It is noted that parts to be welded in a subsequent joining step are predetermined ranges from the ends S of the terminal portions 12dTOUT, 12cTIN, and therefore the terminal portions 12dTOUT, 12cTIN are welded not over the entire length. In addition, for the welding, the insulation coats of the terminal portions 12dTOUT, 12cTIN need to be removed (peeling step).

Next, the joining step for the divisional coils 12B will be specifically described with reference to FIGS. 7, 8.

In order to prevent the coil end part 12e from becoming higher in the axial direction after the welding, the heights of the ends S of the terminal portion 12dTOUT and the terminal portion 12cTIN to be welded to each other are set to be substantially the same height of an inner-circumferential-side coil end part 12eIN which is located on the inner circumferential side and has no joining part. The inner-circumferential-side coil end part 12eIN is configured to have a minimized height by minimizing a gap between the divisional coils 12B overlapping in the radial direction. Thus, as long as the height of a welded part 12Y (joining part) after the ends S are welded is made equal to or lower than the height of the inner-circumferential-side coil end part 12eIN, the height of the entire coil end part 12e does not increase due to the welded part 12Y.

On the inner side in the radial direction of the end S of the terminal portion 12cTIN to be welded, the inner-circumferential-side coil end part 12eIN is located adjacent thereto. If a distance is provided therebetween in the radial direction, the width in the radial direction of the entire coil end part increases, and thus the distance to the surrounding members such as the frame 3 is shortened. Therefore, in order to ensure the insulation distance from these members, a gap between the inner-circumferential-side coil end part 12eIN and the terminal portions 12dTOUT, 12cTIN in the radial direction cannot be made sufficiently large.

Accordingly, as shown in FIG. 7, the light shielding plate 17 is provided between the terminal portion 12cTIN and the inner-circumferential-side coil end part 12eIN. The light shielding plate 17 is for protecting the insulation coat of the inner-circumferential-side coil end part 12eIN from being damaged by arc or the like at the time of welding, and is made from a material resistant to high temperature such as metal or ceramic because the light shielding plate 17 is subjected to heat of welding.

The light shielding plate 17 is provided between the inner-circumferential-side coil end part 12eIN and the terminal portion 12cTIN on the inner side, and is inserted therebetween from the upper side in the axial direction of the stator 10 before welding (light shielding plate inserting step). An end of the light shielding plate 17 that is on the side closer to the stator core 11 is positioned at least lower than the lower end of the part where the terminal portions 12dTOUT, 12cTIN will become the welded part 12Y.

At the time of performing welding, it is necessary that the two terminal portions 12dTOUT, 12cTIN have been brought into close contact with each other. If there is a gap therebetween, there is a possibility that, at the time of welding, melted portions are separated again to cause welding failure. In addition, even if these portions have been joined, a sufficient joining area cannot be ensured, leading to insufficient mechanical strength or increase in electric resistance due to poor joining.

In order to bring the terminal portions 12dTOUT, 12cTIN into close contact with each other, the outer circumferential surface of the terminal portion 12dTOUT is pushed inward in the radial direction by the jig 18 from the outer side in the radial direction, so as to come into close contact with the outer circumferential surface of the terminal portion 12cTIN. The light shielding plate 17 is present on the inner circumferential side of the terminal portion 12cTIN, and the terminal portion 12cTIN is pushed against the light shielding plate 17, so that the two terminal portions 12dTOUT, 12cTIN are sandwiched between the jig 18 and the light shielding plate 17 as a whole.

Figure 10:
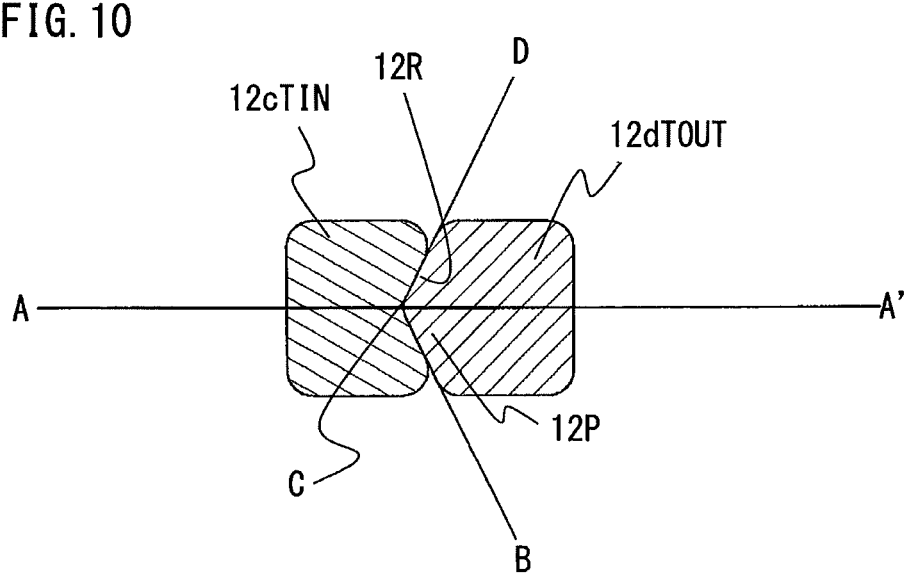
FIG. 10 is a sectional view of both terminal portions before joining, along the direction perpendicular to the axial direction, according to embodiment 1 of the present invention.

FIG. 10 is a sectional view of the terminal portions 12dTOUT, 12cTIN before joining, along the direction perpendicular to the axial direction.

In FIG. 10, the terminal portion 12dTOUT is pushed from the outer side (right side in the drawing) toward the inner side (left side in the drawing) in the radial direction by the jig 18 (not shown here), and further, the terminal portion 12cTIN is also pushed against the light shielding plate via the terminal portion 12dTOUT. As described above, the outer circumferential side of the terminal portion 12cTIN is dented at the center inward in the radial direction so as to have the V-shaped groove 12R in a cross section perpendicular to the axial direction, and the inner circumferential side of the terminal portion 12dTOUT protrudes at the center toward the inner circumferential side so as to have the triangular protrusion 12P in a cross section perpendicular to the axial direction, and thus these terminal portions are in contact with each other via two surfaces of each terminal portion.

In FIG. 10, a line A-A' connecting the centers of the two terminal portions 12dTOUT, 12cTIN extends in the radial direction of the stator 10. An angle A'CD formed by the line A-A' and a tangent line C-D between the contact surfaces of the two terminal portions 12dTOUT, 12cTIN is greater than 0 degrees and smaller than 90 degrees (the outer circumferential side of the line A-A' is defined as 0 degrees and the counterclockwise direction is defined as positive). Similarly, an angle A'CB formed by a tangent line C-B and the line A-A' is greater than −90 degrees and smaller than 0 degrees. Therefore, by the jig 18 pushing the terminal portion 12dTOUT from the outer side toward the inner side, as shown in FIGS. 7, 10, the circumferential-direction positions of the terminal portion 12dTOUT and the terminal portion 12cTIN are aligned and these terminal portions are brought into close contact with each other in the radial direction.

In this state, a welding torch 19 shown in FIG. 7 is brought close to the ends S of the terminal portions 12dTOUT, 12cTIN to be welded, thereby welding them by arc welding. After the welding, the light shielding plate 17 is removed upward in the axial direction, and the jig 18 is released toward the outer side in the radial direction, whereby the joining step is completed. After the welding, a predetermined range of the terminal portions 12dTOUT, 12cTIN including the ends S becomes the welded part 12Y shown in FIG. 8. It is noted that, if the jig 18 for pushing the terminal portion 12dTOUT inward in the radial direction is made from a copper-based material having high conductivity, the jig 18 can serve also as a welding electrode in arc welding. In this case, in order to apply large current at the time of welding, it is necessary to ensure a large contact area between the terminal portion 12dTOUT and the jig 18. Otherwise, without using the jig 18 as a welding electrode, it is also possible to use the other ends of the divisional coils 12B as a current application portion for welding current. In this case, since the welding current is not applied to the jig 18, the jig 18 only has to push the terminal portion 12dTOUT inward, and therefore the length in the axial direction of the jig 18 can be minimized and the lengths of the terminal portions 12dTOUT, 12cTIN can be shortened.

Figure 11:
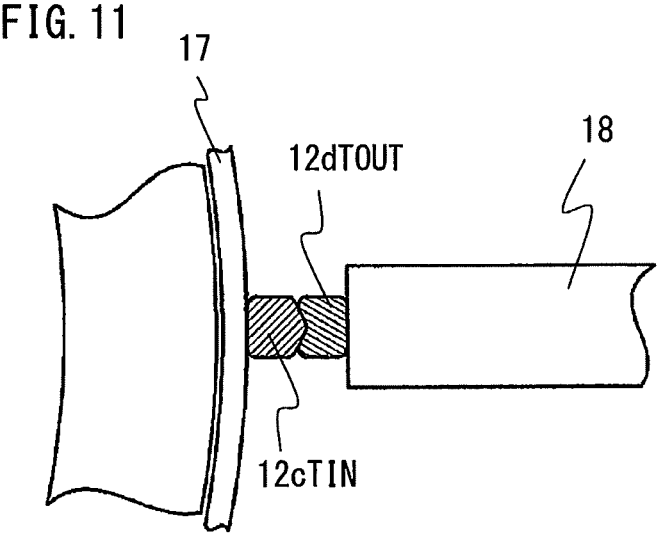
FIG. 11 is a sectional view showing another example of terminal portions of the divisional coil according to embodiment 1 of the present invention.
Figure 12:
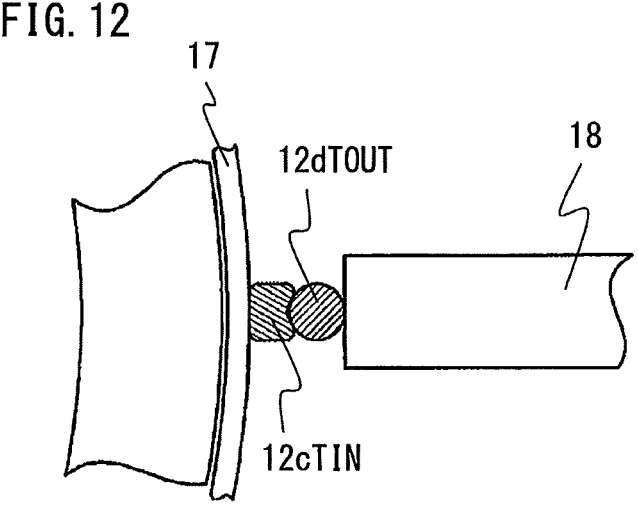
FIG. 12 is a sectional view showing another example of terminal portions of the divisional coil according to embodiment 1 of the present invention.
Figure 13:
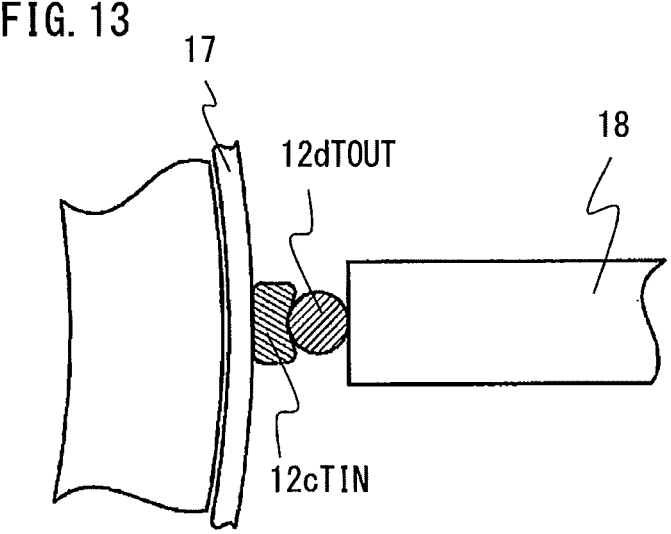
FIG. 13 is a sectional view showing another example of terminal portions of the divisional coil according to embodiment 1 of the present invention.

FIGS. 11 to 13 are sectional views showing other examples of terminal portions of the divisional coils.

The sectional shapes of the coil terminal portions only have to be such shapes that, when the terminal wires are pushed in the radial direction, the terminal wires can be engaged with each other and thus positioning thereof in the radial direction and the circumferential direction can be performed. Therefore, their shapes are not limited to those shown in FIG. 9 described above. For example, as shown in FIG. 11, the dent and the protrusion may be reversed from the example shown in FIG. 7, and also in this case, the same effect is obtained. Alternatively, as shown in FIG. 12, the sectional shape of the wire of one terminal portion may be round and the opposed surface of the other wire may have an arc-shaped dent. If wires having a round sectional shape are used, actually, it is sufficient that shape processing is performed for only one of the two terminal portions. In addition, as shown in FIG. 13, shapes having different widths in the circumferential direction only at the terminal portions may be employed as long as positioning thereof in the radial direction and the circumferential direction can be performed.

Copper and aluminum which are materials of wires used for the divisional coils 12B have high malleability. Therefore, even if the sectional shapes of the terminal portions are deformed into various sectional shapes as shown in the present invention, the materials are not broken and desired shapes can be obtained. In addition, in the case where the wire has an insulation coat, there is a possibility that the coat is cracked or peeled and thus the wire is damaged, leading to loss of insulation property. However, in any case, there is no problem because the insulation coats of the terminal portions are to be removed.

In the stator for rotary electric machine, the rotary electric machine, and the method for manufacturing the rotary electric machine according to embodiment 1 of the present invention, the terminal portions 12dTOUT, 12cTIN of the two divisional coils 12B to be joined are arranged side by side on the entrance side of each slot 15, and the two terminal portions 12dTOUT, 12cTIN can be positioned at predetermined positions in the radial direction and the circumferential direction by the engagement portion provided to at least one of the opposed surfaces of the two terminal portions. Thus, joining failure between the divisional coils 12B can be suppressed.

In addition, the two terminal portions 12dTOUT, 12cTIN are led out side by side in the radial direction on the outer side of the inner-circumferential-side coil end part 12eIN having no joining part, and can be joined to each other at a position equal to or lower than the height of the inner-circumferential-side coil end part 12eIN. Therefore, the height of the entire coil end part 12e can be reduced.

Hereinafter, the reason therefor will be described using a comparative example.

Figure 15:
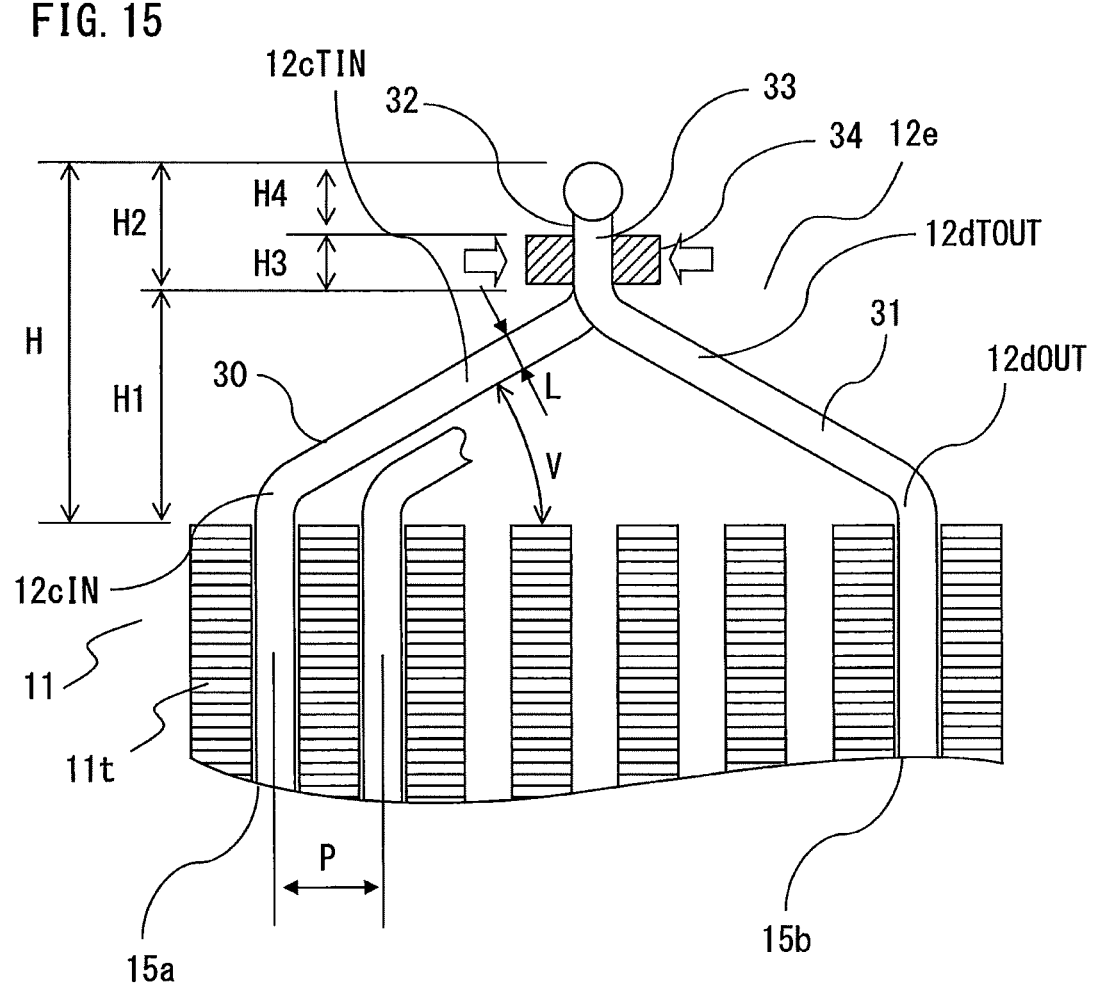
FIG. 15 is a comparative example of a coil end part according to embodiment 1 of the present invention.

FIG. 15 shows a comparative example of the coil end part, and is a schematic view of a terminal wire 12cIN and a terminal wire 12dOUT being joined to each other, as developed in a plane in the circumferential direction and as seen from the outer side. It is noted that, for the purpose of simplification, terminal wires of divisional coils arranged in the other slots are omitted in the drawing. In addition, in FIG. 15, in spite of the comparative example, the corresponding parts are denoted by the same reference characters so that difference can be easily understood.

As described above, the two terminal wires 12cIN and 12dOUT to be joined are arranged in different slots 15, and are joined to each other so as to stride over the teeth 11t, at the coil end part 12e. Here, the terminal wire 12cIN of one divisional coil is arranged in a slot 15a, and the terminal wire 12dOUT of another divisional coil is arranged in another slot 15b separated from the slot 15a with a plurality of teeth 11t therebetween. In FIG. 15, the number of teeth 11t between the terminal wire 12cIN and the terminal wire 12dOUT is six. However, this number may be a different number depending on the designing of the stator or the specifications of the winding.

The terminal wire 12cIN has an inclined portion 30, and the terminal wire 12dOUT has an inclined portion 31. The two inclined portions 30, 31 are inclined in such directions as to approach each other above the stator core 11. The terminal wire 12cIN has, at the end of the inclined portion 30, a straight portion 32 parallel to the axial direction, and the terminal wire 12dOUT has, at the end of the inclined portion 31, a straight portion 33 parallel to the axial direction. Thus, by the inclined portion 30 and the inclined portion 31, the terminal wire 12cIN and the terminal wire 12dOUT approach each other in the circumferential direction, whereby the circumferential-direction positions of the two straight portions 32 and 33 are aligned.

In order to downsize the product without decreasing output of the rotary electric machine, it is effective to reduce the height of the coil end part 12e located upward in the axial direction from the stator core 11. A height H of the coil end part 12e is determined by the sum of a height H1 of the inclined portion 30 and the inclined portion 31 composing the coil end part 12e and a height H2 of the straight portion 32 and the straight portion 33 composing the coil end part 12e. Therefore, the height H of the coil end part 12e can be reduced by reducing the heights H1 and H2.

First, in order to reduce the height H1 of the inclined portions 30, 31, it is effective to reduce an angle V formed by the inclined portion 30, 31 and the upper surface of the stator core 11. For the angle V, the minimum angle can be geometrically calculated from a pitch P between the slots 15 in the circumferential direction and a wire diameter L of the divisional coil, and the angle V cannot be made equal to or smaller than the minimum angle. Therefore, in order to reduce the height of the coil end part 12*e*, it is necessary to shorten the length of the straight portions 32, 33.

As in a grasping method in the comparative example, in the case of grasping the straight portions 32, 33 by nipping them in the circumferential direction by a jig 34 shown in FIG. 15 in order to align the circumferential-direction positions of the two straight portions 32 and 33 to be joined, the base parts (lower end parts) of the straight portions 32, 33 at the ends of the terminal portion 12*c*TIN and the terminal portion 12*d*TOUT are to be grasped. Therefore, as the height H2 of the straight portions, a length H3 corresponding to the axial-direction length of the jig 34 is further needed in addition to a length H4 needed for joining the two terminal wires 12*c*IN, 12*d*OUT.

However, in the stator for rotary electric machine, the rotary electric machine, and the method for manufacturing the rotary electric machine according to embodiment 1 of the present invention, it is not necessary to grasp the terminal portion 12*c*TIN and the terminal portion 12*d*TOUT in the circumferential direction by a jig in order to align the circumferential-direction positions of the terminal portion 12*c*TIN and the terminal portion 12*d*TOUT, and it is sufficient to push the terminal portion 12*d*TOUT inward in the radial direction by the jig 18 shown in FIG. 7.

In addition, as in the case of the comparative example, the base part of the straight portion 33 at the end of the terminal portion 12*d*TOUT may be pushed inward in the radial direction, but unlike the comparative example, it is possible to push the inclined portion 31 lower than the straight portion 33 inward in the radial direction. In the case of pushing the inclined portion 31, the length H3 in the axial direction of the jig 34 which would be needed for grasping in the circumferential direction and included in the height H2 of the straight portions 32, 33, is not needed. Thus, the minimum height H4 needed for joining the terminal wire 12*c*IN and the terminal wire 12*d*OUT can be achieved.

In the stator 10 described in the present embodiment 1, as shown in FIG. 2, the sectional shapes of the wires of the stator coil 12 arranged in the slots 15 are matched with the slot shapes, whereby the space factor of the stator coil 12 is improved and thus the property of the rotary electric machine 100 is improved. The stator coil 12 having such a sectional shape can be obtained by pressing a coil wire using a die in the coil forming step. At this time, by pressing not only the parts to be accommodated into the slots 15 but also the terminal portions at the same time, it is possible to easily process the sectional shapes of the terminal portions 12*c*TIN, 12*d*TOUT.

In joining of the ends S of the terminal portions 12*d*TOUT, 12*c*TIN, which is essential for configuring the stator coil 12 by joining the divisional coils 12B, it is possible to easily position the two terminal portions 12*d*TOUT, 12*c*TIN at predetermined positions in the radial direction and the circumferential direction merely by using the simple jig 18 which pushes the terminal portion 12*d*TOUT inward in the radial direction from the outer side. As a result, it is possible to suppress joining failure between the divisional coils 12B. In addition, since the two terminal portions 12*d*TOUT, 12*c*TIN to be joined are not displaced in the circumferential direction, the intervals between the welded parts 12Y adjacent to each other in the circumferential direction can be made constant and short-circuiting between the adjacent welded parts 12Y can be prevented.

It is noted that, in the rotary electric machine 100 as a subject of the present invention, it is necessary to provide an inverter unit for controlling current to be applied to the stator coil 12, so as to obtain a desired rotation speed or torque in accordance with the rotational position of the rotor 20. In order to downsize the entire product, integrating the inverter unit with the rotary electric machine 100 to minimize the wiring connecting these has been already performed in general. In this case, arrangement in which the inverter unit is directly connected to the upper side of the rotary electric machine 100 shown in FIG. 1 is often employed. By applying the present invention to such a product, the height of the coil end part 12*e* of the rotary electric machine 100 can be reduced, and therefore, in the case of employing a configuration in which the inverter unit is integrated with the rotary electric machine 100, it is possible to downsize the entire product by arranging the components of the inverter unit in the saved space.

Embodiment 2

Hereinafter, a stator for rotary electric machine, a rotary electric machine, and a method for manufacturing a stator for rotary electric machine according to embodiment 2 of the present invention will be described with reference to the drawings, focusing on difference from embodiment 1.

Figure 14:
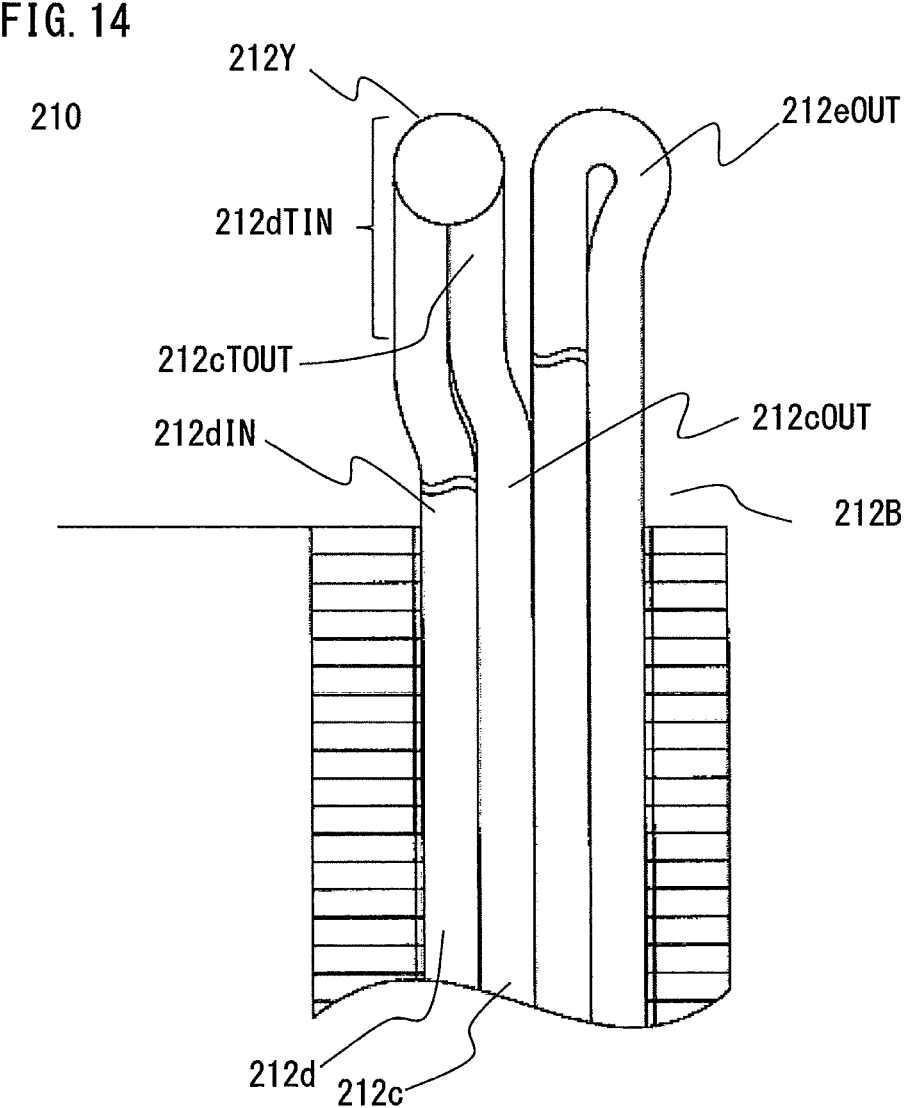
FIG. 14 is a specific-part sectional view of a stator according to embodiment 2 of the present invention.

FIG. 14 is a specific-part sectional view of a stator 210.

In the present embodiment, the arrangement positions of terminal wires to be welded are different from those in embodiment 1. Specifically, a slot accommodation portion 212*d* of one divisional coil 212B is arranged at the bottom of the slot 15, and a slot accommodation portion 212*c* of another divisional coil 212B is accommodated at the second position from the bottom of the slot. A terminal wire 212*c*OUT leading to a slot accommodation portion 212*c*, and a terminal wire 212*d*IN leading to a slot accommodation portion 212*d*, extend upward in the axial direction while being adjacent to each other in the radial direction. A terminal portion 212*d*TIN is provided to the terminal wire 212*d*IN, and a terminal portion 212*c*TOUT is provided to the terminal wire 212*c*OUT. The terminal portion 212*d*TIN and the terminal portion 212*c*TOUT are arranged side by side in the radial direction so as to be in contact with each other, and are arranged at equal intervals in the circumferential direction with a pitch corresponding to the slots 15 of the stator 10 in the circumferential direction.

In joining of the ends of the terminal portion 212*c*TOUT and the terminal portion 212*d*TIN by welding, the light shielding plate 17 is inserted between an outer-circumferential-side coil end part 212*e*OUT and the terminal portion 212*c*TOUT, and at the time of welding, one terminal portion 212*d*TIN is pushed outward in the radial direction so that the terminal portions 212*c*TOUT, 212*d*TIN are brought into close contact with each other. This is similar to embodiment 1. However, the present embodiment is different from embodiment 1 in that, since a welded part 212Y is located on the inner circumferential side, the terminal portion 212*d*TIN is pushed to the terminal portion 212*c*TOUT side from the inner side toward the outer side in the radial direction. Therefore, the sectional shapes of the terminal portions 212*c*TOUT, 212*d*TIN are respectively reversed in the radial direction relative to those of the terminal portions 12*c*TIN, 12*d*TOUT in embodiment 1.

In the stator for rotary electric machine, the rotary electric machine, and the method for manufacturing the stator for rotary electric machine according to embodiment 2 of the present invention, the positioning effect for the terminal portions 212cTOUT, 212dTIN can be obtained at the time of welding the terminal portions 212cTOUT, 212dTIN, as in embodiment 1. It is noted that the insulation coats of the terminal portions 212cTOUT, 212dTIN are peeled in the peeling step before welding, and therefore their conductive parts near the welded part are necessarily exposed. In the configuration of embodiment 1, depending on the arrangement of the frame 3, it might be impossible to ensure a sufficient insulation distance between the coil end part and the welded part. In this case, as in the present embodiment, if the outer-circumferential-side coil end part 212eOUT of which the conductive part is not exposed and which has no joining part is arranged on the outer circumferential side of the welded part 212Y, a necessary insulation distance can be ensured.

It is noted that, within the scope of the present invention, the above embodiments may be freely combined with each other, or each of the above embodiments may be modified or simplified as appropriate.

The invention claimed is:

1. A stator for rotary electric machine, comprising a stator core and a stator coil wound around teeth of the stator core, wherein
the stator core includes
an outer core which is an annular back yoke portion, and
an inner core having the plurality of teeth radially arranged, and having a connection portion via which inner-circumferential-side ends of the teeth adjacent to each other in a circumferential direction are connected to each other in the circumferential direction, the inner core being fitted to an inner side of the outer core,
slots are each formed between the teeth adjacent to each other in the circumferential direction, and slot accommodation portions of divisional coils each of which is a minimum unit composing the stator coil are inserted in each slot so as to be arranged side by side in a radial direction,
a first terminal wire of one of the divisional coils and a second terminal wire of another one of the divisional coils extend toward the same side in the axial direction from the two slot accommodation portions adjacently arranged on an entrance side or a bottom side of each slot,
a first terminal portion of the first terminal wire and a second terminal portion of the second terminal wire are arranged, side by side in the radial direction of the stator, on an upper side in the axial direction of the stator core, so as to be directed upward in the axial direction,
an end of the first terminal portion and an end of the second terminal portion are joined to each other by a joining part, and at least one of the first terminal portion and the second terminal portion leading to the joining part has an engagement portion for positioning the first terminal portion and the second terminal portion with each other in the circumferential direction and the radial direction, and
in a cross section of the engagement portion perpendicular to the axial direction, an angle formed by the radial direction line and a tangent line between contact surfaces of the first terminal portion and the second terminal portion is greater than 0 degrees and smaller than 90 degrees.

2. The stator for rotary electric machine according to claim 1, wherein
the first terminal portion and the second terminal portion each have the engagement portion, and
one of the engagement portions has a V-shaped groove dented in a radial direction in a cross section perpendicular to the axial direction, and the other engagement portion has a triangular protrusion protruding in the radial direction in a cross section perpendicular to the axial direction.

3. The stator for rotary electric machine according to claim 2, wherein
the joining part is provided at a position which is, in the axial direction, equal to or lower than a height of a coil end part via which the slot accommodation portions of the divisional coil are continuously connected.

4. A method for manufacturing the stator for rotary electric machine according to claim 3, the method comprising:
a peeling step of peeling an insulation coat of the terminal portion of each divisional coil;
an engagement portion forming step of forming the engagement portion; and
a joining step of engaging the first terminal portion and the second terminal portion with each other by the engagement portion provided to at least one of the first terminal portion and the second terminal portion, and fixing the first terminal portion and the second terminal portion with each other in the radial direction, and then joining the ends of the first terminal portion and the second terminal portion to each other.

5. A method for manufacturing the stator for rotary electric machine according to claim 2, the method comprising:
a peeling step of peeling an insulation coat of the terminal portion of each divisional coil;
an engagement portion forming step of forming the engagement portion; and
a joining step of engaging the first terminal portion and the second terminal portion with each other by the engagement portion provided to at least one of the first terminal portion and the second terminal portion, and fixing the first terminal portion and the second terminal portion with each other in the radial direction, and then joining the ends of the first terminal portion and the second terminal portion to each other.

6. The stator for rotary electric machine according to claim 1, wherein
one of the first terminal portion and the second terminal portion has a round shape in a cross section perpendicular to the axial direction, and the other one of the first terminal portion and the second terminal portion has the engagement portion having an arc shape dented in the radial direction in a cross section perpendicular to the axial direction.

7. The stator for rotary electric machine according to claim 6, wherein
the joining part is provided at a position which is, in the axial direction, equal to or lower than a height of a coil end part via which the slot accommodation portions of the divisional coil are continuously connected.

8. A method for manufacturing the stator for rotary electric machine according to claim 7, the method comprising:
a peeling step of peeling an insulation coat of the terminal portion of each divisional coil;

an engagement portion forming step of forming the engagement portion; and a joining step of engaging the first terminal portion and the second terminal portion with each other by the engagement portion provided to at least one of the first terminal portion and the second terminal portion, and fixing the first terminal portion and the second terminal portion with each other in the radial direction, and then joining the ends of the first terminal portion and the second terminal portion to each other.

9. A method for manufacturing the stator for rotary electric machine according to claim 6, the method comprising:

a peeling step of peeling an insulation coat of the terminal portion of each divisional coil;

an engagement portion forming step of forming the engagement portion; and a joining step of engaging the first terminal portion and the second terminal portion with each other by the engagement portion provided to at least one of the first terminal portion and the second terminal portion, and fixing the first terminal portion and the second terminal portion with each other in the radial direction, and then joining the ends of the first terminal portion and the second terminal portion to each other.

10. The stator for rotary electric machine according to claim 1, wherein the joining part is provided at a position which is, in the axial direction, equal to or lower than a height of a coil end part via which the slot accommodation portions of the divisional coil are continuously connected.

11. A method for manufacturing the stator for rotary electric machine according to claim 10, the method comprising:

a peeling step of peeling an insulation coat of the terminal portion of each divisional coil;

an engagement portion forming step of forming the engagement portion; and a joining step of engaging the first terminal portion and the second terminal portion with each other by the engagement portion provided to at least one of the first terminal portion and the second terminal portion, and fixing the first terminal portion and the second terminal portion with each other in the radial direction, and then joining the ends of the first terminal portion and the second terminal portion to each other.

12. A rotary electric machine comprising:

the stator for rotary electric machine according to claim 1; and a rotor held so as to be rotatable while being opposed to an inner circumferential surface of the stator.

13. A method for manufacturing the stator for rotary electric machine according to claim 1, the method comprising:

a peeling step of peeling an insulation coat of the terminal portion of each divisional coil;

an engagement portion forming step of forming the engagement portion; and a joining step of engaging the first terminal portion and the second terminal portion with each other by the engagement portion provided to at least one of the first terminal portion and the second terminal portion, and fixing the first terminal portion and the second terminal portion with each other in the radial direction, and then joining the ends of the first terminal portion and the second terminal portion to each other.

14. The stator for rotary electric machine according to claim 1, wherein the first terminal portion and the second terminal portion each have the engagement portion, one of the engagement portions has a V shape dented from the other engagement portion toward the one engagement portion in a cross section perpendicular to the axial direction at a contact surface thereof which is in contact with the other engagement portion so as to be opposed thereto in the radial direction, and the other engagement portion has a triangular shape protruding from the other engagement portion toward the one engagement portion in a cross section perpendicular to the axial direction at a contact surface thereof which is in contact with the one engagement portion.

15. The stator for rotary electric machine according to claim 1, wherein the first terminal portion and the second terminal portion each have the engagement portion, one of the engagement portions has a round shape in a cross section perpendicular to the axial direction, and the other engagement portion has an arc shape dented from the one engagement portion toward the other engagement portion in a cross section perpendicular to the axial direction at a contact surface thereof which is in contact with the one engagement portion so as to be opposed thereto in the radial direction.

16. A method for manufacturing a stator for rotary electric machine, comprising a stator core and a stator coil wound around teeth of the stator core, wherein the stator core includes an outer core which is an annular back yoke portion, and an inner core having the plurality of teeth radially arranged, and having a connection portion via which inner-circumferential-side ends of the teeth adjacent to each other in a circumferential direction are connected to each other in the circumferential direction, the inner core being fitted to an inner side of the outer core, slots are each formed between the teeth adjacent to each other in the circumferential direction, and slot accommodation portions of divisional coils each of which is a minimum unit composing the stator coil are inserted in each slot so as to be arranged side by side in a radial direction, a first terminal wire of one of the divisional coils and a second terminal wire of another one of the divisional coils extend toward the same side in the axial direction from the two slot accommodation portions adjacently arranged on an entrance side or a bottom side of each slot, a first terminal portion of the first terminal wire and a second terminal portion of the second terminal wire are arranged, side by side in the radial direction of the stator, on an upper side in the axial direction of the stator core, so as to be directed upward in the axial direction, and an end of the first terminal portion and an end of the second terminal portion are joined to each other by a joining part, and at least one of the first terminal portion and the second terminal portion leading to the joining part has an engagement portion for positioning the first terminal portion and the second terminal portion with each other in the circumferential direction and the radial direction, the method comprising:

a peeling step of peeling an insulation coat of the terminal portion of each divisional coil, an engagement portion forming step of forming the engagement portion, a joining step of engaging the first terminal portion and the second terminal portion with each other by the engagement portion provided to at least one of the first terminal portion and the second terminal portion, and fixing the first terminal portion and the second terminal portion with each other in the radial direction, and then joining the ends of the first terminal portion and the second terminal portion to each other, and before the joining step, a light shielding plate inserting step of inserting a light shielding plate for shielding arc in welding, between a coil end part via which the slot accommodation portions of the divisional coil are continuously connected, and one, of the terminal portions, that is adjacent to the coil end part in the radial direction.

17. A method for manufacturing a stator for rotary electric machine, comprising a stator core and a stator coil wound around teeth of the stator core, wherein the stator core includes
an outer core which is an annular back yoke portion, and
an inner core having the plurality of teeth radially arranged, and having a connection portion via which inner-circumferential-side ends of the teeth adjacent to each other in a circumferential direction are connected to each other in the circumferential direction, the inner core being fitted to an inner side of the outer core, slots are each formed between the teeth adjacent to each other in the circumferential direction, and slot accommodation portions of divisional coils each of which is a minimum unit composing the stator coil are inserted in each slot so as to be arranged side by side in a radial direction, a first terminal wire of one of the divisional coils and a second terminal wire of another one of the divisional coils extend toward the same side in the axial direction from the two slot accommodation portions adjacently arranged on an entrance side or a bottom side of each slot, a first terminal portion of the first terminal wire and a second terminal portion of the second terminal wire are arranged, side by side in the radial direction of the stator, on an upper side in the axial direction of the stator core, so as to be directed upward in the axial direction, and an end of the first terminal portion and an end of the second terminal portion are joined to each other by a joining part, and at least one of the first terminal portion and the second terminal portion leading to the joining part has an engagement portion for positioning the first terminal portion and the second terminal portion with each other in the circumferential direction and the radial direction, wherein the first terminal portion and the second terminal portion each have the engagement portion, and one of the engagement portions has a V-shaped groove dented in a radial direction in a cross section perpendicular to the axial direction, and the other engagement portion has a triangular protrusion protruding in the radial direction in a cross section perpendicular to the axial direction, the method comprising:

a peeling step of peeling an insulation coat of the terminal portion of each divisional coil, an engagement portion forming step of forming the engagement portion, a joining step of engaging the first terminal portion and the second terminal portion with each other by the engagement portion provided to at least one of the first terminal portion and the second terminal portion, and fixing the first terminal portion and the second terminal portion with each other in the radial direction, and then joining the ends of the first terminal portion and the second terminal portion to each other, and before the joining step, a light shielding plate inserting step of inserting a light shielding plate for shielding arc in welding, between a coil end part via which the slot accommodation portions of the divisional coil are continuously connected, and one, of the terminal portions, that is adjacent to the coil end part in the radial direction.

* * * * *